Jan. 19, 1965  D. W. MOLINS ETAL  3,166,179
APPARATUS FOR HANDLING ROD-LIKE ARTICLES SUCH AS CIGARETTES
Filed Dec. 11, 1962  5 Sheets-Sheet 1
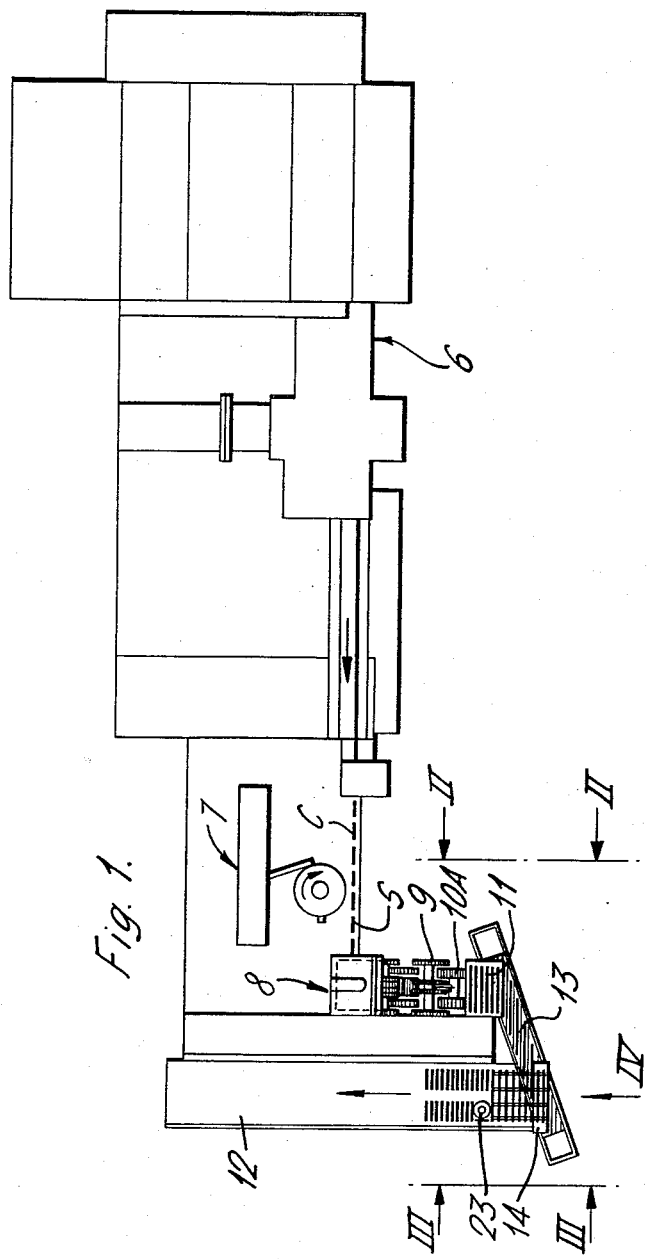

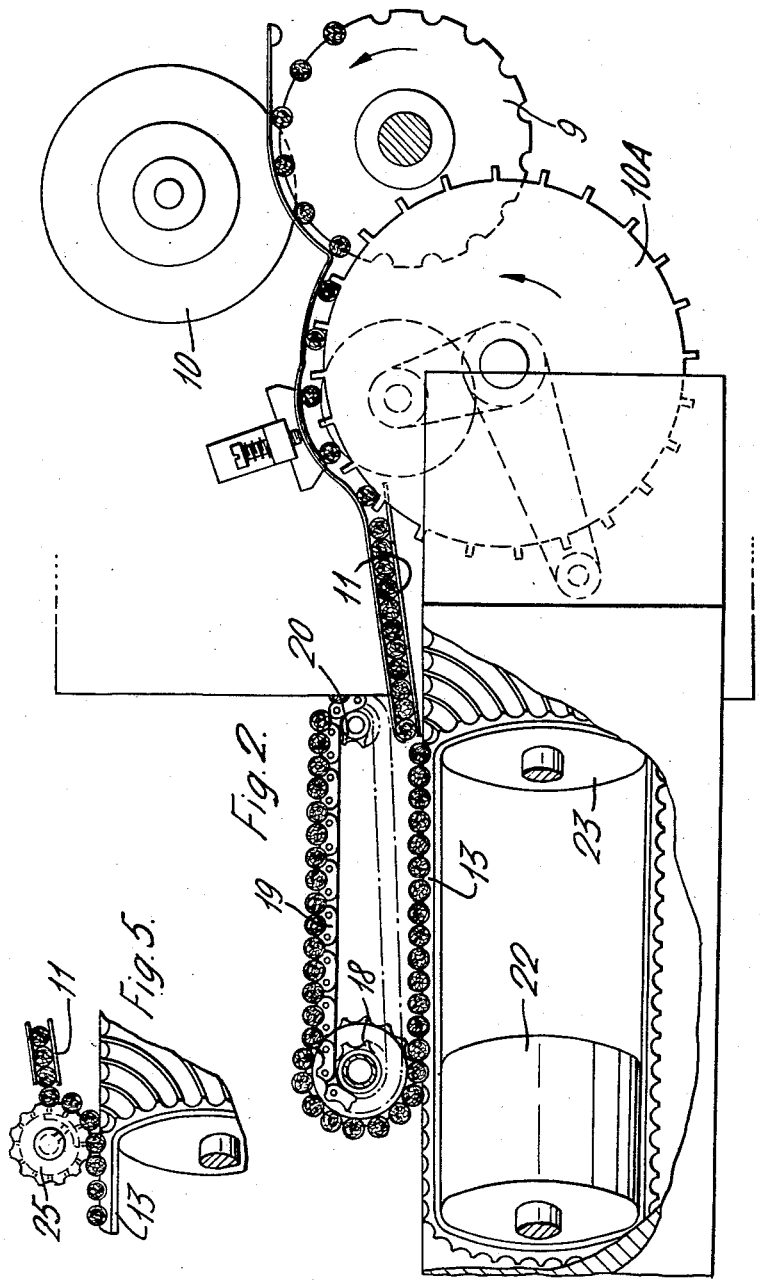

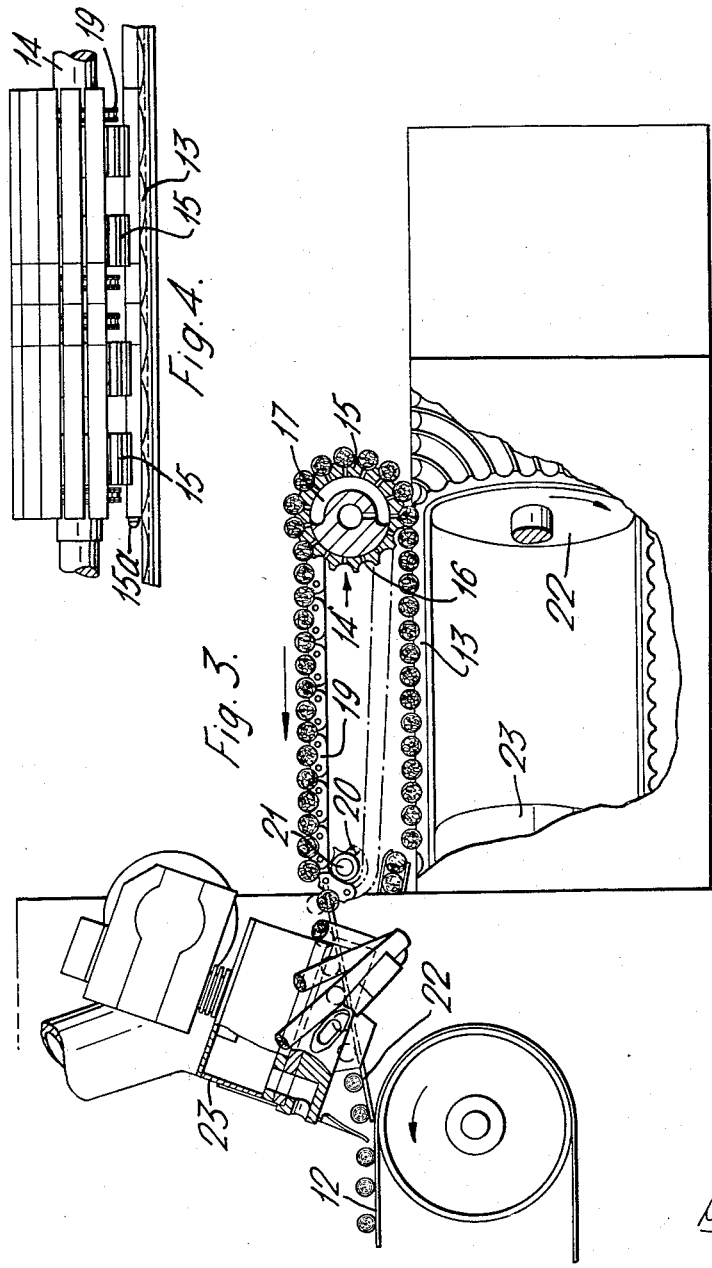

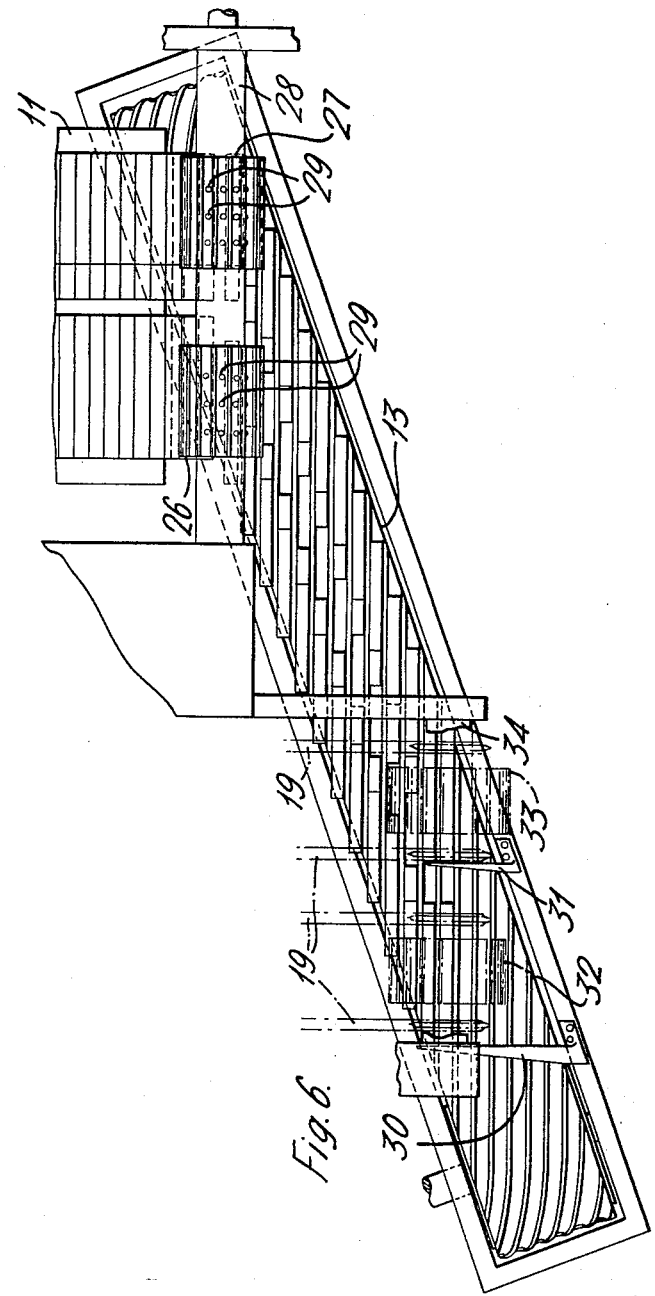

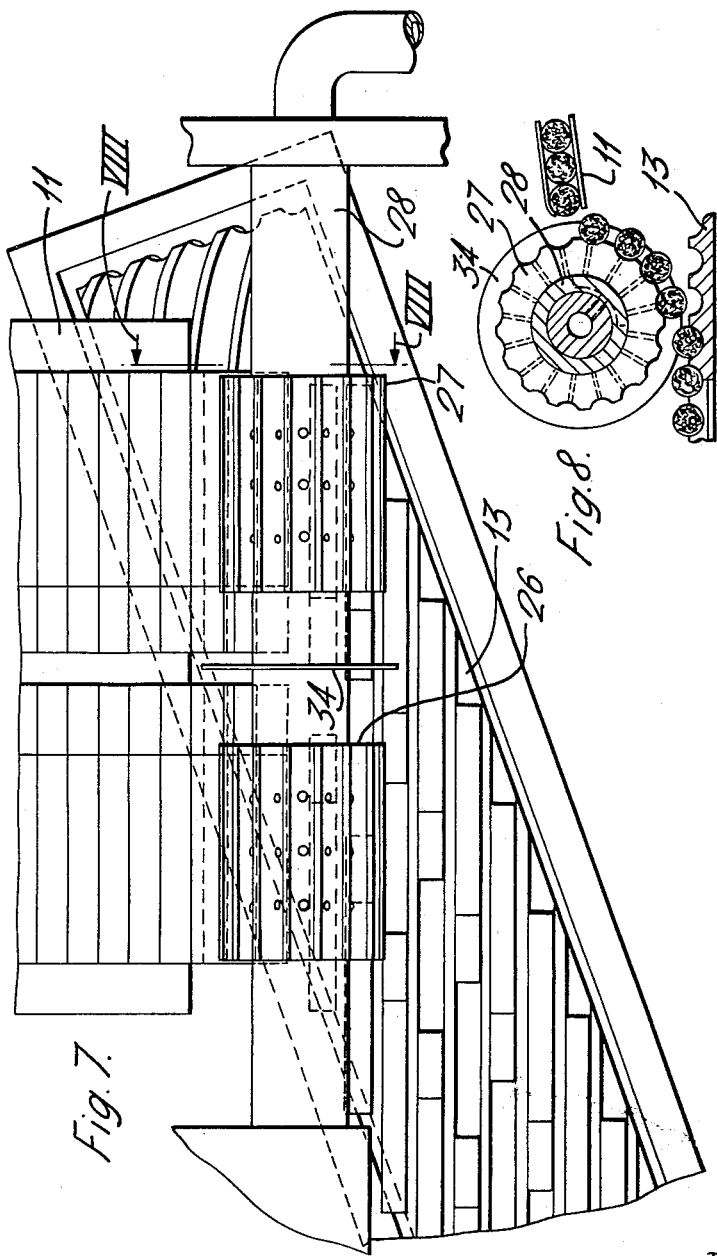

United States Patent Office 3,166,179
Patented Jan. 19, 1965

3,166,179
APPARATUS FOR HANDLING ROD-LIKE
ARTICLES SUCH AS CIGARETTES
Desmond Walter Molins and Tom Rowlands, Deptford,
London, England, assignors to Molins Machine Company Limited, London, England, a company of Great
Britain
Filed Dec. 11, 1962, Ser. No. 243,795
Claims priority, application Great Britain, Dec. 13, 1961,
44,646
8 Claims. (Cl. 198—34)

This invention concerns improvements in or relating to apparatus for handling rod-like articles such as cigarettes. In particular, it concerns apparatus associated with a continuous rod cigarette-making machine and arranged to receive cigarettes delivered by the machine and moving sideways, and to reverse the direction of movement of those cigarettes.

According to the present invention there is provided apparatus for handling rod-like articles such as cigarettes, comprising conveyor-means to convey articles in succession in a direction transverse to their axes, further conveyor-means to convey the said articles in the opposite direction, and a transfer conveyor to receive articles from the first said conveyor-means and deliver them to the said further conveyor-means, said transfer conveyor extending obliquely from one to the other of said conveyor-means and arranged to move with a component in the direction of movement of one of them, and having article-receiving recesses, e.g. flutes, extending obliquely across the transfer conveyor so as to be parallel with the axes of the articles on both the said conveyor-means.

Preferably the articles are deposited in the recesses of the transfer conveyor from the first said conveyor-means and are picked up from the said recesses by suction means associated with the said further conveyor-means.

There may be provided a suction transfer member associated with the first said conveyor-means and arranged to deposit articles in the recesses of the transfer conveyor.

The said transfer conveyor may comprise an endless conveyor band, and the said recesses comprise flutes extending obliquely across the conveyor band.

Further according to the present invention there is provided apparatus for handling rod-like articles, such as cigarettes, comprising conveyor-means to convey pairs of articles, the two articles in each pair being in aligned, end-to-end arrangement, in succession in a direction transverse to the axes of the articles, further conveyor-means to convey the said pairs of articles in the opposite direction, and a transfer conveyor to receive the said pairs of articles from the first said conveyor-means and deliver them to the said further conveyor-means, said transfer conveyor extending obliquely from one to the other of the said conveyor-means and being arranged to move with a component in the direction of movement of one of them, and having article-receiving recesses, each adapted to receive a pair of articles, extending obliquely across the transfer conveyor so as to be substantially parallel with the axes of the articles on both the said conveyor-means.

The leading article of a pair (as considered in the direction of the component of movement of the transfer conveyor parallel to the axes of the articles) is moved with an axial component of movement by the transfer conveyor relatively to the trailing article of the said pair, so that the two articles of the said pair can become spaced apart endwise in a recess of the transfer conveyor. The apparatus may comprise a pair of stops associated with the transfer conveyor and positioned so that each stop can engage one of the two articles in a recess of the transfer conveyor so as to correctly locate the said two articles prior to their removal from the transfer conveyor.

There may be provided transfer means associated with the first said conveyor-means to transfer articles therefrom to the said transfer conveyor, wherein the said transfer means is adapted to transfer the leading article of a pair into a recess of the transfer conveyor, before transferring the trailing article of the said pair into the said recess. For example, the transfer means may comprise a pair of suction transfer members of which one deposits one article of a pair in a recess before the other deposits the other article of the said pair in the said recess.

Alternatively, the apparatus may comprise a stop member arranged to engage the trailing article of a pair in a recess of the transfer conveyor and to hold the said article against movement with a component in the direction of its axis until it has been moved a predetermined distance in a direction transverse to its axis by the transfer conveyor. The apparatus may comprise a pair of coaxially mounted rotatable suction transfer members associated with the first said conveyor-means, of which one deposits one article and the other deposits the other article of a pair in a recess of the transfer conveyor, and the stop member may comprise a rotatable disc mounted coaxially with and between the said transfer members.

Preferably pairs of articles are deposited in the recesses of the transfer conveyor from the first said conveyor-means, and there are provided suction means associated with the said further conveyor-means whereby the pairs of articles can be picked up from the recesses of the transfer conveyor.

Apparatus in accordance with the invention will now be described by way of example with reference to the accompanying drawings, in which:

FIGURE 1 is a diagrammatic plan view showing a cigarette-making machine for making mouthpiece cigarettes and including one embodiment of apparatus according to the invention;

FIGURE 2 is a view on the line II—II, FIGURE 1;

FIGURE 3 is a view on the line III—III, FIGURE 1;

FIGURE 4 is a view in the direction of the arrow IV, FIGURE 1;

FIGURE 5 is a fragmentary view showing a suction transfer device;

FIGURE 6 is a plan view of part of the apparatus shown in FIGURE 1 illustrating a modification;

FIGURE 7 is a plan view of part of the apparatus shown in FIGURE 6, illustrating a further modification, and FIGURE 8 is a view on the line VIII—VIII in FIGURE 7.

Referring first chiefly to FIGURE 1, this shows diagrammatically a continuous rod cigarette-making machine, generally indicated by the reference numeral 6. Stub-feeding mechanism 7 feeds stubs S into spaces between cigarettes C, and groups, each consisting of a pair of cigarettes with a double-length stub between them, are fed into mechanism generally indicated by the reference numeral 8 which causes the groups to move sideways and unites the component parts of each group by wrapping an adhesive uniting band around the stub and around the end portions of the cigarettes which abut the stub. The resulting double-length assemblages are moved sideways in succession by fluted discs 9 (see FIGURE 2) past a rotating knife 10 which cuts midway through the stub portion of each assemblage, thus producing two individual mouthpiece cigarettes. The two cigarettes in each pair thus produced are slightly spaced apart endwise as they move away from the knife 10 by means of a spacing guide (not shown), this endwise spacing not being shown in FIGURE 1 on account of the small scale of that figure. These cigarettes are then further conveyed sideways by toothed wheels 10A, from which they are transferred to a sloping ramp 11 down which they roll. The elements 9, 10A and 11 constitute part of conveyor means by which the groups and (after severing) the cigarettes are conveyed sideways, i.e. in a direction transverse to their axes.

It is required to reverse the direction of movement of the cigarettes, and for this purpose a conveyor 12, FIGURES 1 and 3, is provided, which runs in the direction of the arrow shown on it in FIGURE 1, and means are provided to transfer the cigarettes onto the conveyor 12.

A transfer conveyor 13 extends obliquely from beneath the ramp 11 to a position beneath a rotating shaft 14, see also FIGURES 3 and 4, which is provided with four fluted wheels 15 whose flutes have suction apertures 16 capable of communicating with suction chambers 17 (FIGURE 3). The shaft 14 is also provided with four sprockets 18. Chains 19 pass about the sprockets 18 and also about sprockets 20 on a further shaft 21. The suction chambers 17 in the wheels 15 extend halfway around the wheels as shown in FIGURE 3 so that suction is applied to flutes which are moving from the lower to the upper part of the wheels.

The transfer conveyor 13 consists of a fluted conveyor band made of a flexible material and passing about rollers 22 and 23, one of which is driven by any suitable means. The band is provided with flutes which extend obliquely across the band so that when the band is arranged as shown, the flutes are parallel with the axes of the cigarettes on the conveyor members 9, 10A and 11 and also with the axes of cigarettes on the conveyor 12. Accordingly the flutes of the conveyor 13 receive cigarettes from the ramp 11 and carry them towards the suction wheels 15 in staggered, overlapping relationship and with their axial alignment undisturbed. Moreover, as the conveyor band is disposed obliquely as shown and the cigarettes are thus received on it in overlapping relationship to one another and are conveyed by the conveyor with a component of movement in the direction in which they were formerly conveyed sideways, it is possible for the conveyor to be moved relatively slowly, thus avoiding undue acceleration of the cigarettes.

The suction wheels 15 can be arranged to rotate in the direction indicated by the arrow above the chains 19, FIGURE 3 and at a speed such that a line of flutes with suction apertures 16 registers with a pair of cigarettes carried on a flute in the conveyor 13 while the cigarettes are moving with a component perpendicular to their axes which is equal in speed to the speed of the suction wheels 15. The cigarettes are picked up by the suction apertures and lifted from the conveyor 13, and carried around with the suction wheels, from which they are deposited on to recesses in the chains 19, as shown in FIGURE 3.

A stop 15a, FIGURE 4, is provided to ensure that the pairs of cigarettes are properly located longitudinally before being picked up by the wheels 15.

From the chains 19 the cigarettes are transferred to the conveyor 12, one row of cigarettes passing down a ramp 22, FIGURE 3, while the cigarettes of the other row are engaged by a device 23 which turns them end for end before depositing them on to the conveyor 12. The purpose of this is to arrange the cigarettes on the conveyor 12 with their tipped ends all pointing the same way.

FIGURE 5 illustrates a modification in which the end of the ramp 11 is positioned higher than in the arrangement shown in FIGURE 2, and a suction transfer member 25, (which may consist of four suction wheels similar to the suction wheels 15 mentioned above) is arranged to receive successive pairs of cigarettes from the ramp and to carry them down and deposit them in successive flutes in the conveyor 13.

In the modification shown in FIGURE 6 the suction transfer member 25 consists of two fluted suction drums 26 and 27 mounted on a common rotatable shaft 28. The pairs of mouthpiece cigarettes, with the two cigarettes in each pair in aligned, end-to-end arrangement, pass in succession down the ramp 11 and are deposited by the drums 26 and 27 in the flutes of the transfer conveyor band 13. The drum 26 deposits the leading cigarette of a pair (as considered in the direction of the component of movement of the transfer conveyor 13 parallel to the axes of the cigarettes) in a flute of the band 13, and the drum 27 deposits the trailing cigarette of the pair in the same flute.

Suction chambers inside the drums 26 and 27, with which suction parts 27 can register, are arranged so that the drum 26 releases the leading cigarette slightly before the drum 27 releases the trailing cigarette of a pair. Thus the leading cigarette, by being received in a flute of the band 13 before the trailing cigarette, is moved with an axial component of movement by the transfer conveyor relatively to the trailing article, so that the two articles of the pair become spaced apart endwise in the flute of the transfer conveyor.

A pair of stops 30 and 31 (which replace the stop 15a previously described) are arranged so that the leading cigarette of a pair (i.e. the left-hand cigarette as viewed in FIGURE 6) comes to rest against the stop 30, while the other cigarette of the pair comes to rest against the stop 31. As can be seen from FIGURE 6, the endwise separation of the two cigarettes in a pair when they are first deposited on the band 13 is greater than their separation when they come to rest against the stops 30 and 31. The purpose of this is to allow the leading cigarette of a pair to move past the stop 31 without engaging the latter, the two stops then correctly locating the two cigarettes in each pair for removal from the transfer conveyor.

Two fluted suction drums 32 and 33 (which replace the suction wheels 15 previously described) are mounted on a common rotatable shaft 34 above the transfer conveyor 13, the drums 32 and 33 being shown in chain-dot line in FIGURE 6. The drums 32 and 33 pick up the cigarettes from the flutes of the transfer conveyor, the drum 32 picking up the leading cigarette and the drum 33 the trailing cigarette of each pair. The cigarettes are then deposited on the recesses in the chains 19 to be transferred to the conveyor 12, the two cigarettes in each pair retaining their endwise spaced relationship.

In the modification illustrated in FIGURES 7 and 8, which show an alternative arrangement whereby the two cigarettes in a pair can become spaced apart endwise in a flute of the transfer conveyor 13, the suction drums 26 and 27 deposit the two cigarettes of a pair simultaneously into a flute of the band 13. A disc 34 is mounted on the shaft 28 between the drums 26 and 27 for rotation therewith. As can best be seen from FIGURE 8, the trailing cigarette of a pair, i.e., the cigarette deposited by the drum 27, is engaged by the disc 34, and held against movement with a component in the direction of its axis until the conveyor band 13 has moved the cigarette a sufficient distance in a direction transverse to its axis (to the left as viewed in FIGURE 8) for the cigarette to clear the disc 34. During the time that the trailing cigarette is thus engaged by the disc 34, the leading cigarette of the pair is being moved by the conveyor 13 with a component of movement in the direction of its axis relatively to the trailing cigarette, so that the two cigarettes become spaced apart endwise in the flute of the band 13. The cigarettes are then arrested by the stops 30 and 31, as previously described with reference to FIGURE 6, to correctly locate the two cigarettes in each pair prior to their removal from the transfer conveyor 13.

What we claim as our invention and desire to secure by Letters Patent is:

1. Apparatus for handling rod-like articles comprising conveyor means to convey articles in succession in a direction transverse to their axes, further conveyor-means to convey the said articles in the opposite direction, a transfer conveyor to receive articles from the first said conveyor-means and deliver them to the said further conveyor-means, said transfer conveyor extending obliquely from one to the other of said conveyor-means, consisting of an endless conveyor band of flexible material, and having article-receiving, flutes formed therein and extending obliquely across the transfer conveyor so as to be substantially parallel with the axes of the articles on both the said conveyor-means, and means to move the transfer conveyor with a component in the direction of movement of one of the said conveyor-means.

2. Apparatus for handling rod-like articles, comprising conveyor-means to convey pairs of articles, the two articles in each pair being in aligned, end-to-end arrangement, in succession in a direction transverse to the axes of the articles, further conveyor-means to convey the said pairs of articles in the opposite direction, a transfer conveyor to receive the said pairs of articles from the first said conveyor-means and deliver them to the said further conveyor-means, said transfer conveyor consisting of an endless conveyor band of flexible material and extending obliquely from one to the other of the said conveyor-means, and having article-receiving recesses, formed therein, each adapted to receive a pair of articles, extending obliquely across the transfer conveyor so as to be substantially parallel with the axes of the articles on both the said conveyor-means, and means to move the transfer conveyor with a component in the direction of movement of one of the said conveyor-means.

3. Apparatus as claimed in claim 2, wherein the leading article of a pair (as considered in the direction of the component of movement of the transfer conveyor parallel to the axes of the articles) is moved with an axial component of movement by the transfer conveyor relatively to the trailing article of the said pair, so that the two articles of the said pair can become spaced apart endwise in a recess of the transfer conveyor.

4. Apparatus as claimed in claim 3, comprising a pair of stops associated with the transfer conveyor and positioned so that each stop can engage one of the two articles in a recess of the transfer conveyor so as to correctly locate the said two articles prior to their removal from the transfer conveyor.

5. Apparatus as claimed in claim 3, comprising transfer means associated with the first said conveyor-means to transfer articles therefrom to the said transfer conveyor, wherein the said transfer means is adapted to transfer the leading article of a pair into a recess of the transfer conveyor, before transferring the trailing article of the said pair into the said recess.

6. Apparatus as claimed in claim 5, wherein the said transfer means comprises a pair of suction transfer members of which one deposits one article of a pair in a recess before the other deposits the other article of the said pair in the said recess.

7. Apparatus as claimed in claim 3, comprising a stop member arranged to engage the trailing article of a pair in a recess of the transfer conveyor and to hold the said article against movement with a component in the direction of its axis until it htas been moved a predetermined distance in a direction transverse to its axis by the transfer conveyor.

8. Apparatus as claimed in claim 7, comprising a pair of co-axially mounted rotatable suction transfer members associated with the first said conveyor-means, of which one deposits one article and the other deposits the other article of a pair in a recess of the transfer conveyor, and wherein the said stop member comprises a rotatable disc mounted coaxially with and between the said transfer members.

References Cited by the Examiner

UNITED STATES PATENTS 2,093,437  9/37  Gwinn.

FOREIGN PATENTS 519,628  3/31  Germany.
535,635  5/43  Great Britain.

SAMUEL F. COLEMAN, *Primary Examiner.*

EDWARD A. SROKA, *Examiner.*